(12) United States Patent
Kasper

(10) Patent No.: US 6,691,308 B1
(45) Date of Patent: Feb. 10, 2004

(54) METHOD AND APPARATUS FOR CHANGING MICROCODE TO BE EXECUTED IN A PROCESSOR

(75) Inventor: Christian D. Kasper, Andover, MA (US)

(73) Assignee: STMicroelectronics, Inc., Carrollton, TX (US)

( * ) Notice: Subject to any disclaimer, the term of this patent is extended or adjusted under 35 U.S.C. 154(b) by 0 days.

(21) Appl. No.: 09/475,927

(22) Filed: Dec. 30, 1999

(51) Int. Cl.[7] .................................................. G06F 9/44
(52) U.S. Cl. ......................... 717/168; 712/5; 712/224; 712/225; 712/226; 712/211
(58) Field of Search ................................. 717/169, 168; 710/20; 712/32, 224, 211, 5, 225, 226, 248

(56) References Cited

U.S. PATENT DOCUMENTS

| | | | | |
|---|---|---|---|---|
| 5,796,974 A | * | 8/1998 | Goddard et al. | ............... 712/32 |
| 5,860,104 A | * | 1/1999 | Wit et al. | .................... 711/137 |
| 5,887,152 A | * | 3/1999 | Tran | ............................ 712/217 |
| 5,983,337 A | * | 11/1999 | Mahalingaiah et al. | ........ 712/32 |
| 6,295,644 B1 | * | 9/2001 | Hsu et al. | ................... 717/169 |

OTHER PUBLICATIONS

IBM Technical Disclosure Bulletin, published Oct. 1, 1993.*

* cited by examiner

*Primary Examiner*—Tuan Dam
*Assistant Examiner*—Chuck Kendall
(74) *Attorney, Agent, or Firm*—Lisa K. Jorgenson; William A. Munck

(57) ABSTRACT

A Central Processing Unit (CPU) hotpatch circuit compares the run-time instruction stream against an internal cache. The internal cache stores embedded memory addresses with associated control flags, executable instruction codes, and tag information. In the event that a comparison against the current program counter succeeds, then execution is altered as required per the control flags. If no comparison match is made, then execution of the instruction that was accessed by the program counter is executed.

23 Claims, 4 Drawing Sheets

| CONTROL FLAGS | FIELD | OPERATION | OTHER | EXPLANATION |
|---|---|---|---|---|
| 1. | V | | | VALID |
| 2. | A | | | ADDRESS |
| 3. | O | | | OPCODE |
| 4. | G | | | GLOBAL |
| 5. | | I | | INSERT |
| 6. | | M | | MATCH |
| 7. | | B | | BLOCK ASSIGNMENT |
| 8. | | X | | DELETE |
| 9. | | | E | EXTERNAL ROM |
| 10. | | | H | HALT |
| 11. | | | L | LOCK |
| 12. | | | Q | GENERATE TRAP |

| 0 | OF |
|---|---|
| 1 | ACL |
| 2 | ICL |
| 3 | ACE |
| 4 | |
| 5 | |
| 6 | |
| 7 | IA |
| 8 | |
| 9 | |
| 10 | |
| 11 | |
| 12 | |
| 13 | |
| 14 | |
| 15 | SA |
| 16 | |
| 17 | |
| 18 | |
| 19 | |
| 20 | |
| 21 | II |
| 22 | |
| 23 | |
| 24 | |
| 25 | |
| 26 | |
| 27 | ICE |
| 28 | SI |
| 29 | SM |
| 30 | PI |
| 31 | DM |

23'

| FIELD | DEFINITION | EXPLANATION |
|---|---|---|
| OF(0) | ENABLE OPERATION FLAG | ENABLE FULL CACHE OPERATION (ENABLED=1, DEFAULT=0) |
| ACL(1) | ACACHE LOCK | PREVENTS WRITE INTO ACACHE LINES (ENABLED=1, DEFAULT=0) |
| ICL(2) | ICACHE LOCK | PREVENTS WRITE INTO ICACHE LINES (ENABLED=1, DEFAULT=0) |
| ACE(3) | ACACHE ENABLE | TURNS ON THE ADDRESS CACHE BLOCK (ENABLED=1, DEFAULT=0) |
| IA(14:4) | ACACHE LINE INDEX | INDEX OF ACACHE LINE MATCHING COMPERAND |
| SA(15) | ACACHE MATCH STATUS | REPORT MATCH STATUS (VALID=1, NO MATCH=0) |
| II(26:16) | ICACHE LINE INDEX | INDEX OF ICACHE LINE MATCHING COMPERAND |
| ICE(17) | ICACHE ENABLE | TURNS ON INSTRUCTION CACHE CIRCUIT BLOCK |
| SI(28) | ICACHE MATCH STATUS | REPORT MATCH STATUS FOR ICACHE (0=NO MATCH, 1=MATCH) |
| SM(29) | SELF-MODIFY | ENABLES ROM CODE TO MODIFY A/ICACHE (ENABLED=1, DEFAULT=0) |
| PI(30) | PRIORITY INDICATOR | ESTABLISHES PRIORITY OF DUAL MATCH RESULTS (0=ACACHE, 1=ICACHE) |
| DM(31) | DEBUG MODE | DUMP CACHE LINE MATCHES TO BUFFER RATHER THAN INTO PIPELINE |

*FIG. 5*

METHOD AND APPARATUS FOR CHANGING MICROCODE TO BE EXECUTED IN A PROCESSOR

BACKGROUND OF THE INVENTION

1. Field of the Invention

This invention relates generally to processors and, more specifically, to a method and apparatus which provides run-time correction for microcode, code enhancement, and/or interrupt vector reassignment.

2. Description of the Prior Art

For integrated circuits which are driven by microcode embedded in internal memory, many times it is necessary to either have the instruction content of the embedded memory device or the behavior of the Central Processing Unit (CPU) pipeline itself corrected or debugged in the field. This may require on-the-fly modifications driven by customer request or updates due to evolution of industry protocol standards. However, this creates problems since it is difficult to correct and/or debug these types of circuits. Debugging and/or changing the embedded microcode is a time consuming, effort which generally requires messy cyclic redundancy check (CRC) changes or related check sum modifications.

Therefore, a need exists to provide a circuit by which either the instruction content of the internal memory and/or the behavior of the CPU pipeline itself could be corrected and/or debugged in the field. The debug circuit should consume only a small amount of silicon real estate, be inexpensive to implement and allow changes at a faster rate than current techniques. The debug circuit must also provide a means by which the debug circuit could download data to debug the device. Data could be downloaded by the host system or managed via a simplistic communication scheme as described in the ST52T3 data book written by STMicroelectronics, Inc.

SUMMARY OF THE INVENTION

It is object of the present invention to provide a circuit by which either the instruction content of an internal memory and/or the behavior of the CPU pipeline itself could be corrected and/or debugged in the field.

It is another object of the present invention to provide a debug circuit which consumes only a small amount of silicon real estate, is inexpensive to implement and allow changes at a faster rate then current techniques.

It is still a further object of the present invention to provide a debug circuit which provides a means by which the debug circuit could download data to debug the device.

BRIEF DESCRIPTION OF THE PREFERRED EMBODIMENTS

In accordance with one embodiment of the present invention, a hot patch system for changing of code in a processor is disclosed. The hot patch system has a memory, such as a Read Only Memory (ROM), for storing a plurality of instructions. A program counter is coupled to the memory for indexing of the memory to access an instruction. A cache system is coupled to the memory and to the program counter. The cache system is used for comparing information associated with the instruction from memory with information stored in the cache system. If there is a comparison match, the cache system alters the instruction stream as designated by information stored in the cache system. If no match occurs, the cache system sends the instruction from memory into the instruction stream.

In accordance with another embodiment of the present invention, a method of altering the code of a pipeline processor is disclosed. The method requires that a plurality of instructions be stored in memory. A cache is provided and information is stored in the cache. The memory is indexed to access one of the instructions stored in memory. Information associated with the instruction from memory is compared with information stored in the cache. If a comparison match is made, the instruction stream is altered as designated by the information stored in the cache. If no comparison match is made, the instruction from memory is inserted into the instruction stream.

The foregoing and other objects, features, and advantages of the invention will be apparent from the following, more particular, description of the preferred embodiments of the invention, as illustrated in the accompanying drawing.

BRIEF DESCRIPTION OF THE DRAWINGS

FIG. 5 shows one example of the bit configuration of the cache control register used in the present invention.

DETAILED DESCRIPTION OF THE PREFERRED EMBODIMENTS

Figure 1:
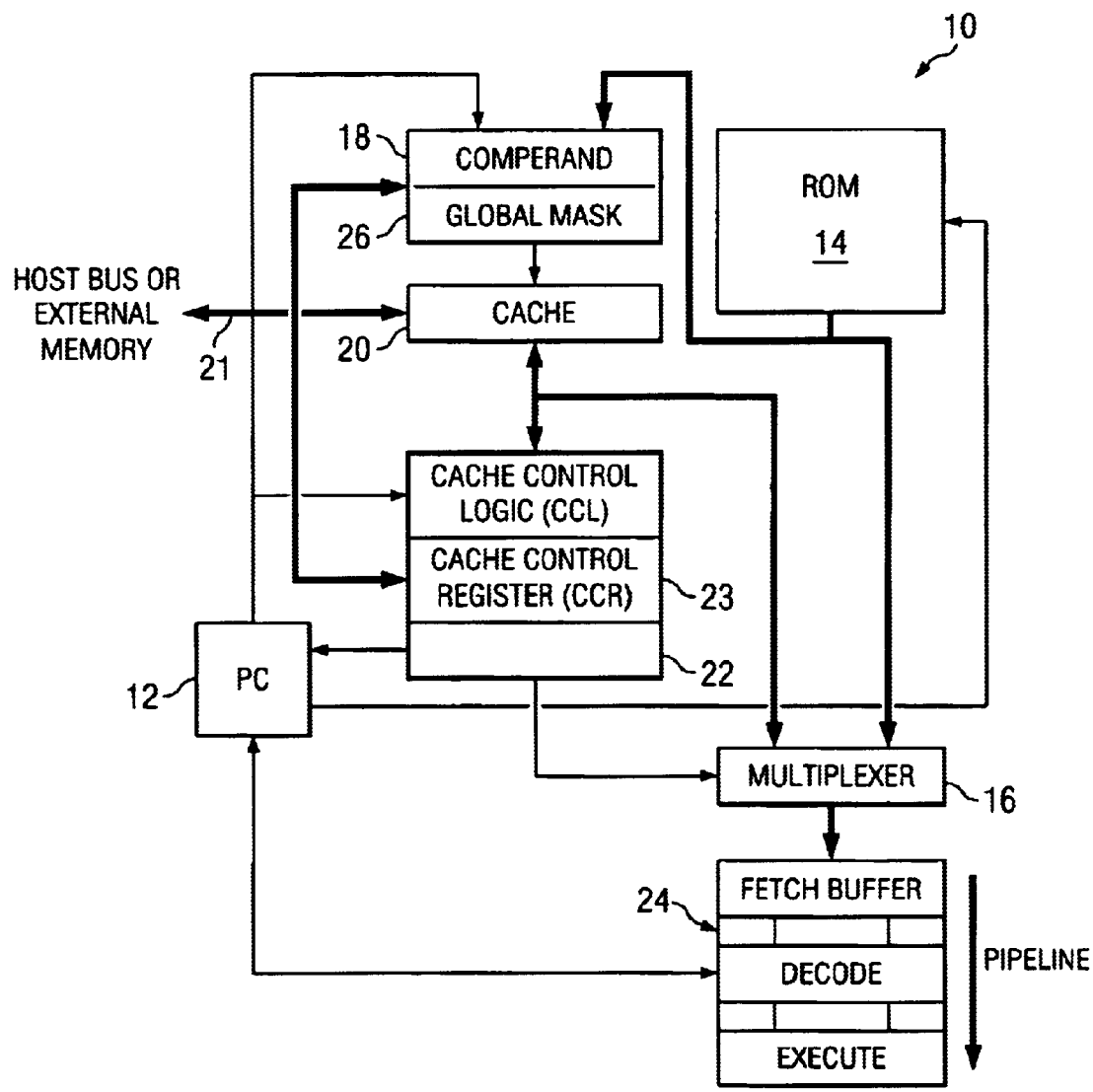
FIG. 1 is a simplified block diagram of one embodiment of the hot patch circuit of the present invention.

Referring to FIG. 1, one embodiment of a hot patch circuit 10 (hereinafter circuit 10) is shown. The circuit 10 provides a means whereby the instruction content of an embedded memory device or the behavior of the Central Processing Unit (CPU) may be corrected, modified and/or debugged. The circuit 10 is preferably used in a pipeline CPU.

The circuit 10 has a program counter 12. The program counter 12 is coupled to a memory device 14 and to a register 18. The program counter 12 is used to generate an address of an instruction to be executed. When the address is generated, the program counter 12 will index the memory unit 14. The memory unit 14 stores instructions which are to be executed by the CPU. The memory unit 14 is a nonvolatile memory device like a Read Only Memory (ROM) device. Once the program counter 12 accesses the instruction which is stored in the memory unit 14, the instruction is sent to a multiplexer 16.

The register 18 is coupled to the memory unit 14, the program counter 12, and to a cache unit 20. The register 18 is used to store data which will be compared to data which is stored in the cache unit 20. The register 18 may either store the address sent from the program counter 12 or the instruction which the program counter 12 access from the memory unit 14.

Figures 3, 4:
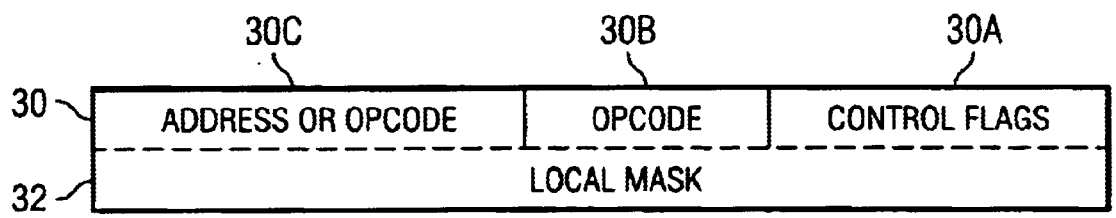
FIG. 3 shows one example of the different fields associated with the cache used in the present invention.
FIG. 4 shows one example of the control codes used in the control flag field of FIG. 3.

As may be seen in FIG. 4, the cache unit 20 is comprised of a plurality of cache lines 30. Each cache line 30 is comprised of at least three different fields: a control flag field 30A, an op-code field 30B which stores the new instruction to be inserted into the instruction stream, and an address/op-code field 30C which stores the data which is to be compared to the data stored in the register 18. The size of the fields will vary based on the implementation of the circuit 10. In accordance with one embodiment of the present invention, the width of the cache line 30 would be able to accommodate at least a 32-bit op-code (field 30B) along with a 10 to 32-bit address/op-code (field 30C) and a 2 to 8-bit control flag field (field 30A). This would yield a cache line width between 44 to 72-bits. However, it should be noted that these field lengths are only given as one example and should not be seen as limiting the scope of the present invention. As stated above, bit field dimensions will vary depending on the size of the memory unit 14.

The control flag field 30A is used to dictate both the semantic content and the execution behavior of individual or multiple cache lines 30. The number of control flags is dependent upon the allocated field size. In some cases, a combination of control flags may be useful. Control flags may be used to either delete or enable cache unit entries, or provide alternate semantic information regarding the register content. Referring to FIG. 3, some examples of the control flag code are shown. The valid flag "V" indicates whether the entry in the cache unit 20 is valid. The "A" and "O" flags indicate whether the information to be compared is an address or an op-code. The global flag "G" allows for greater than 1:1 mapping. For example, if the address flag "A" is set, one would only be comparing the one particular address in the memory unit 14. Thus, there is only a 1:1 mapping. However, if the op-code "O" and global "G" flags are set, one would be able to replace every occurrence of a particular instruction that is accessed from the memory unit 14. Thus, the global flag "G" allows one to make better use of the space in the cache unit 20. The insert "I", match "M", block assignment "B", and delete "X" flags are used by the cache control logic 22 to control access to the instruction stream. The "I" flag implies that the associated op-code in the cache is to be inserted into the instruction stream. The "M" flag indicates that when the contents of the register 18 match that in the cache unit 20, the cache unit instruction is to replace the instruction from the memory unit 14 in the instruction stream. The "B" flag allows for more than one instruction (i.e., a block of instructions) stored in the cache unit 20 to be clocked into the instruction stream. The "X" flag indicates that the relevant instruction is to be ignored or deleted (i.e., no operation (NOP)). The "E", "H", "L", and "Q" flags are pipeline control flags. The "E" flags indicates that if there is a match to jump to external memory using the address in the "opcode field" and to execute the instructions in external memory starting at that location. The "H" flag allows one to stop the clock for purposes of debugging the pipeline. The "L" flag allows one to lock the cache unit 20 and the "Q" flag is a generate trap flag. The control codes shown in FIG. 3 are just examples and should not be seen to limit the scope of the present invention. Different sets or embodiments of flags could be used depending on the particular implementation.

In the embodiment depicted in FIG. 1, the cache unit is a fully associative or direct-mapped cache which would contain memory unit addresses with associated control flags, executable instructions, and tag information. The cache unit 20 may be a content addressable memory whereby the data in the register 18 is compared to all the contents in the cache unit 20.

The cache 20 is also coupled to a bus 21. The bus 21 could be coupled to a host bus or to external memory. The bus 21 allows data to be downloaded into the cache 20 or allows instructions to be executed from the external memory. Contents of the cache 20 could be downloaded by the host system or managed via a simple communication scheme as described in the ST52T3 data book written by STMicroelectronics, Inc.

Cache control logic 22 is coupled to the cache unit 20 and to the multiplexer 16. The cache control logic 22 controls the operation of the cache unit 20 and when a particular instruction will be inserted into the instruction stream of the pipeline 24. If there is no comparison match, the cache control logic 22 will let the instruction from the memory unit 14 flow through the multiplexer 16 to the pipeline 24. When there is a comparison match, the instruction from the memory unit 14 is replaced by a new instruction from the cache unit 20 in the pipeline 24. The cache control logic 22 will have a cache control register 23. The cache control register 23 allows one to control the cache unit 20 and to control insertion of an instruction into the pipeline 24. By setting various bits in the cache control register 23, one would be able to enable/disable the cache unit 20, modify the contents of the cache unit 20 and control the general operation of the cache unit 20. The cache control register 23 will be described in further detail in relation to the dual cache system of FIG. 2.

A mask register 26 may be coupled to the cache unit 20. The mask register 26 may be a global mask register which would affect the entire cache unit 20 or a local mask register 32 (FIG. 3) whereby a single cache line 30 would have an associated local mask register 32. The mask register 26 provides flexibility to the circuit 10. The mask register 32 allows flexibility by allowing one to control how the data from the memory unit 14 is matched with data in the cache unit 20. For example, if all of the bits in the global mask register 26 were set to 1, then whatever data came through the register 18 would be matched one to one against that of the cache unit 20. One could also set the global mask register 26 to invalidate the instructions within cache unit 20 and let the memory unit instructions be executed as accessed by the program control 12. The mask register 26 may also be used to modify the contents of the cache unit 20 by using simple write instructions.

Figure 2:
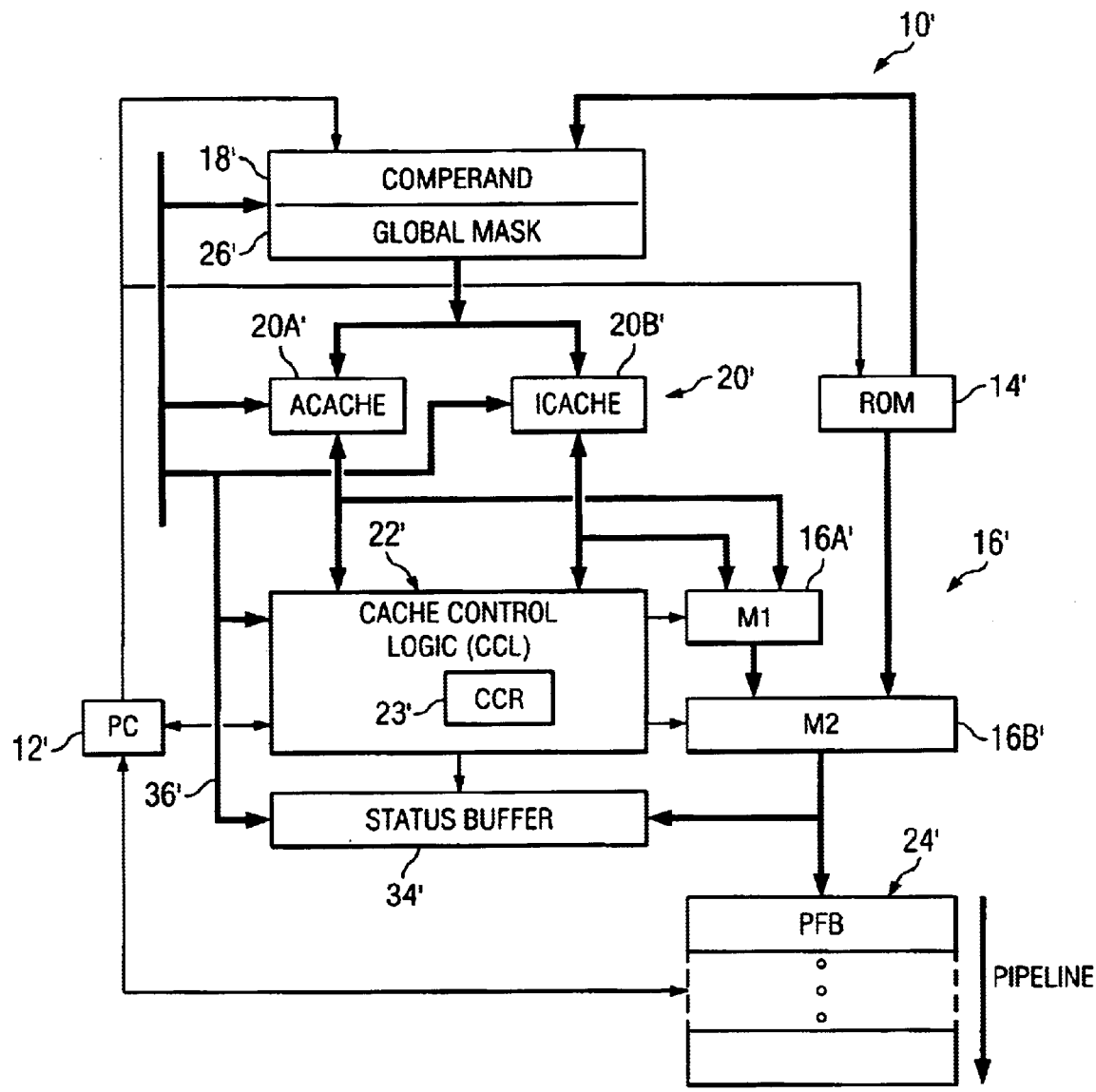
FIG. 2 is a simplified block diagram of a second embodiment of the hot patch circuit of the present invention.

Referring to FIG. 2, a second embodiment of the present invention is shown wherein like numerals represent like elements with the exception of a "'" to indicate another embodiment. The circuit 10' looks and operates in a similar fashion as circuit 10 depicted in FIG. 1. One difference in circuit 10' is that the cache 20' is divided into two separate caches: an address cache 20A' and an instruction cache 20B'. Thus, for the address cache 20A', the third field of the cache line will contain the memory unit address location to be matched, and for the instruction cache 20A', the third field of the cache line will contain the memory unit instruction to be matched.

The cache control logic 22' operates in a similar fashion as disclosed above. For the dual cache system, one implementation of the cache control register 23' is shown in FIG. 5. As can be seen in FIG. 5, by setting different bits in the cache control register 23', one is able to control the operation of the cache unit 20'. The cache control register 23' depicted in FIG. 5 would be used in the dual cache system of FIG. 2. The cache control register bit definition as shown in FIG. 5 is just one example and should not be seen to limit the scope of the present invention. Different configurations of bits could be used depending on the particular implementation.

The dual cache system also uses two multiplexers 16A' and 16B'. The first multiplexer 16A' has a first input coupled to the output of the address cache 20A', a second input coupled to the output of the instruction cache 20B', a third input coupled to the cache control logic 22', and an output coupled to the second multiplexer 16B'. The second multiplexer 16B' has a first input coupled to the output of the first multiplexer 16A', a second input coupled to the output of the memory device 14', a third input coupled to the cache control logic 22', and outputs coupled to the pipeline 24' and the status buffer 34'. In operation, the cache control logic 23' will control which cache 20A' or 20B' is enabled and if there is a dual match if both caches 20A' and 20B' are enabled, which cache has priority. If there is a comparison match, the cache control logic 22' will cause the multiplexer 16A' to send an output from the cache unit 20' to the second multiplexer 16B'. The cache control logic 22' will then cause the multiplexer 16B' to insert the output from the cache unit 20' into the instruction stream to be executed. If there is no comparison match, the cache control logic 22' will cause the multiplexer 16B' to insert the instruction from the memory unit 14' into the pipeline 24'.

In the embodiment depicted in FIG. 2, the circuit 10' has a status buffer 34'. The status buffer 34' has an input coupled to the cache control logic 22', an input coupled to the second multiplexer 16B', and an input coupled to the bus 36'. The status buffer is used to store information related to the operation of the circuit 10'. For example, the status buffer could be used to gather debug information such as what line of code was matched. Although not shown in FIG. 1, it should be noted that the status buffer 34' could also be used in the embodiment depicted in FIG. 1.

OPERATION

Referring now to Table 1 below, the operation of circuit 10 will be described. It should be noted that the operation of circuit 10' is similar to 10 and will not be described in detail.

TABLE 1

| | Cache | | | Program | Code |
|---|---|---|---|---|---|
| | Flags | Address | Op-code | Counter | Stream |
| 1 | MA | 0111111 | CP32 A, C | 0111111 | CP32 A, C |
| 2 | IR | 1000000 | MOV A, B | 1000000 | 100000 |
| 3 | RA | 1000010 | SAV B | 1000001 | MOV A, B |
| 4 | RA | 1000011 | ADD B, C | 1000010 | 100001 |
| 5 | XA | 1000101 | | 1000011 | SAV B |
| | | | | 1000101 | ADD B, C |
| | | | | 1000110 | NOP |
| | | | | 1000111 | 1000110 |
| | | | | | 1000111 |

When the program counter 12 generates the address 011111, the program counter 12 will index the memory 14. The instruction associated with address 0111111 from the memory unit 14 will be stored in the multiplexer 16. The address from the program counter 12 is also sent to the register 18 where it is compared to the data stored in the cache unit 20. As can be seen above, for address 0111111 there is a comparison match with cache line 1. Since the "M" flag is set for cache line 1, the op-code in cache line 1 will replace the instruction from memory. Thus the cache control logic 23 will send the CP32 A,C instruction associated with cache line 1 through the multiplexer 16 into the pipeline 24 to be executed.

The next address generated by the program counter 12 is 1000000. The memory unit instruction associated with address 1000000 is sent from the memory unit 14 and stored in the multiplexer 16. The address generated by the program counter 12 is sent to the register 18 where it is compared to the data stored in the cache unit 20. For the address 1000000 there is a comparison match with cache line 2. Since the "I" flag is set for cache line 2, the op-code in cache line 2 (i.e., MOV A,B) will be inserted into the instruction stream after the instruction associated with the memory unit address location 1000000.

The next address generated by the program counter 12 is 1000001. For this address there is no comparison match.

Thus, the cache control logic 23 will send the instruction associated with memory unit address location 1000001 through the multiplexer 16 into the pipeline 24 to be executed.

For the next address, 1000010, there is a comparison match with cache line 3. Since the "R" flag is set in cache line 3, the op-code in cache line 3 (i.e., SAV B) replaces the memory unit instruction associated with the address 1000010 in the instruction stream.

The next address generated by the program counter is 1000011. For this address, there is a comparison match with cache line 4. Since the "R" flag is set in cache line 4, the op-code ADD B,C in cache line 4 replaces the memory unit instruction associated with the address 1000011 in the instruction stream.

The next address in the program counter is 1000101. Again there is a comparison match. This time the match is with cache line 5. Cache line 5 has the "X" flag set so the instruction is ignored or deleted (i.e., no operation (NOP)).

For the last two addresses in the program counter, 1000110 and 1000101, this is no comparison match. Thus, the cache control logic 23 will send the instruction associated with these memory unit address locations through the multiplexer 16 into the pipeline 24 to be execute.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A hot patch system for changing of code in a processor comprising, in combination:

a memory storing a plurality of instructions;

a program counter coupled to the memory and generating addresses of instructions to be accessed in the memory; and a cache system comprising at least one cache storing addresses, op-codes, or both, the cache system coupled to the memory and to the program counter and capable of comparing both addresses and op-codes, the cache system:

selectively comparing, for each address generated by the program counter, either the address to addresses stored in the cache system, or an op-code associated with an instruction at the address within the memory to op-codes stored in the cache system, and altering an instruction stream when there is a comparison match.

2. A hot patch system in accordance with claim 1, wherein the cache system further comprises:

a mask register coupled to the cache and controlling whether the address or the op-code is compared with addresses or op-codes stored in the cache a register coupled to the cache and storing the address or the op-code to be compared to addresses or op-codes stored in the cache; and cache control logic coupled to the cache and controlling insertion of one of the instruction from the memory or an instruction from the cache system into the instruction stream.

3. A hot patch system in accordance with claim 2, further comprising:

a connection by which contents of the cache system may be changed.

4. A hot patch system in accordance with claim 3, wherein the cache comprises a plurality of cache lines, each cache line including at least a first field storing flag information controlling whether an address or an op-code is compared and insertion of instructions into the instruction stream, a second field storing an op-code, and a third field for storing an address or an op-code to be compared with the address or the op-code stored in the register.

5. A hot patch system in accordance with claim 4 wherein the flag information controls instruction handling, enabling replacement of an instruction within the instruction stream, insertion of an instruction into the instruction stream, deletion of an instruction from the instruction stream, and block replacement of a set of instructions within the instruction stream.

6. A hot patch system in accordance with claim 4, wherein the flag information controls pipeline flow, enabling jumping of the instruction stream to instructions within external memory, stopping a clock driving execution of the instruction stream, locking of the cache system, and generating a trap flag.

7. A hot patch system in accordance with claim 4, wherein the flag information enables either global replacement of each op-code within the instruction stream matching an op-code within the respective cache line or replacement of a single instance of the op-code within the instruction stream associated with an instruction in the memory at an address within the respective cache line.

8. A hot patch system in accordance with claim 4, wherein the cache comprises:
   an address cache containing addresses for comparison to addresses of instructions within the memory; and
   an instruction cache containing op-codes for comparison to op-codes of instructions within the memory.

9. A hot patch system in accordance with claim 8, wherein the cache control logic has priority flags for discriminating priority between an address cache hit and an instruction cache hit.

10. A hot patch system in accordance with claim 2, wherein the mask register is employed to modify addresses and op-codes in the cache.

11. A hot patch system in accordance with claim 2, wherein the mask register contains a global mask controlling address or op-code comparisons for every cache line within the cache, and wherein at least one cache line includes a local mask controlling address or op-code comparisons for the respective cache line.

12. A hot patch system in accordance with claim 1, further comprising:
   a multiplexer having a first input coupled to the cache, a second input coupled to the memory, and a third input coupled to the cache control logic.

13. A hot patch system in accordance with claim 1, further comprising:
   a first multiplexer having a first input coupled to the address cache, a second input coupled to the instruction cache, and the third input coupled to the cache control logic; and
   a second multiplexer having a first input coupled to an output of the first multiplexer, a second input coupled to the memory unit, and a third input coupled to the cache control logic.

14. A method of altering the code of a pipeline processor comprising the steps of:
   storing a plurality of instructions in memory;
   storing addresses, op-codes or both in a cache;
   for each of a plurality of addresses:
      accessing the memory with an address to access an instruction;
      selectively comparing either the address or an op-code associated with an instruction at the address within the memory to addresses or op-codes in the cache, wherein at least one address within the plurality of addresses is compared to addresses within the cache and at least one op-code for an instruction at an address within the plurality of addresses is compared to op-codes within the cache; and
   inserting an instruction from the cache into the instruction stream when the address or the op-code compared to addresses or op-codes within the cache matches an address or op-code in the cache.

15. The method of claim 14, further comprising the step of inserting the instruction from memory into the instruction stream when the address or the op-code for the instruction from memory does not match the addresses or op-codes in the cache.

16. The method of claim 14, wherein the step of storing addresses, op-codes or both in the cache further comprises:
   storing a plurality of cache lines in the cache, each cache line including a first field containing flag information controlling whether an address or an op-code is compared and insertion of instructions into the instruction stream, a second field containing an op-code, and a third field containing an address or op-code to be compared with one of the plurality of addresses or an op-code associated with an instruction at one of the plurality of addresses within the memory.

17. The method of claim 16, wherein the flag information controls instruction handling, enabling replacement of an instruction within the instruction stream, insertion of an instruction into the instruction stream, deletion of an instruction from the instruction stream, and block replacement of a set of instructions within the instruction stream.

18. The method of claim 16, wherein the flag information controls pipeline flow, enabling jumping of the instruction stream to instructions within external memory, stopping a clock driving execution of the instruction stream, locking of the cache system, and generating a trap flag.

19. The method of claim 14 wherein the cache comprises an address cache containing addresses for comparison to addresses of instructions within the memory and an instruction cache containing op-codes for comparison to op-codes of instructions within the memory, the method further comprising:
   discriminating priority between an address cache hit and an instruction cache hit.

20. The method of claim 14, further comprising:
   employing a global mask to control comparisons for all cache lines within the cache; and
   employing a local mask within a cache line to control comparisons for that cache line.

21. A hot patch system for changing of code in a processor comprising, in combination:
   a memory storing a plurality of instructions;
   a program counter coupled to the memory and generating addresses of instructions to be accessed in the memory; and
   a cache system comprising at least one cache storing addresses, op-codes, or both, the cache system coupled to the memory and to the program counter and capable of comparing both addresses and op-codes,
   the cache system capable of comparing each address generated by the program counter to addresses stored in the cache system and capable of comparing an op-code associated with an instruction within the memory at each address generated by the program counter to op-codes stored in the cache system, and the cache system altering an instruction stream when there is a comparison match.

22. A hot patch system for changing of code in a processor comprising, in combination:

a memory storing a plurality of instructions;

a program counter coupled to the memory and generating addresses of instructions to be accessed in the memory; and a cache system comprising at least one cache storing addresses and op-codes, the cache system coupled to the memory and to the program counter and capable of comparing both addresses and op-codes, the cache system:

selecting, for each address generated by the program counter, one of the respective address, for comparison to addresses stored in the cache system, an op-code associated with an instruction at the respective address within the memory, for comparison to op-codes stored in the cache system, and the respective address and the op-code associated with the instruction at the respective address, for comparison to addresses and op-codes stored in the cache system, and altering an instruction stream when there is a comparison match.

23. A hot patch set of machine usable content for changing code executed by a processor, comprising:

at least one address for comparison to each address generated by a program counter during execution of the code; and at least one op-code for comparison to op-codes associated with instructions at each address generated by a program counter during execution of the code.

* * * * *